Sept. 12, 1933. K. K. MORTERUD 1,926,494
HEATING DEVICE
Filed May 11, 1933
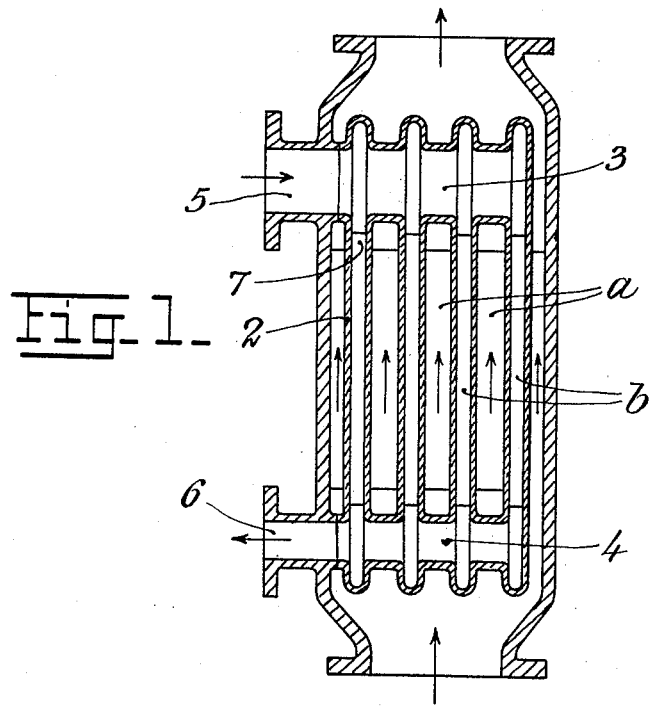
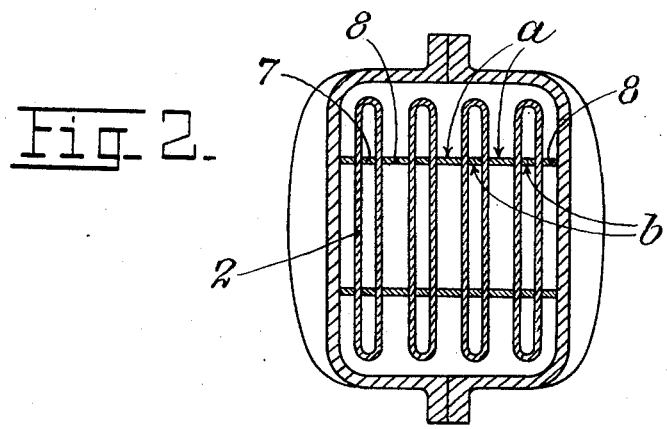
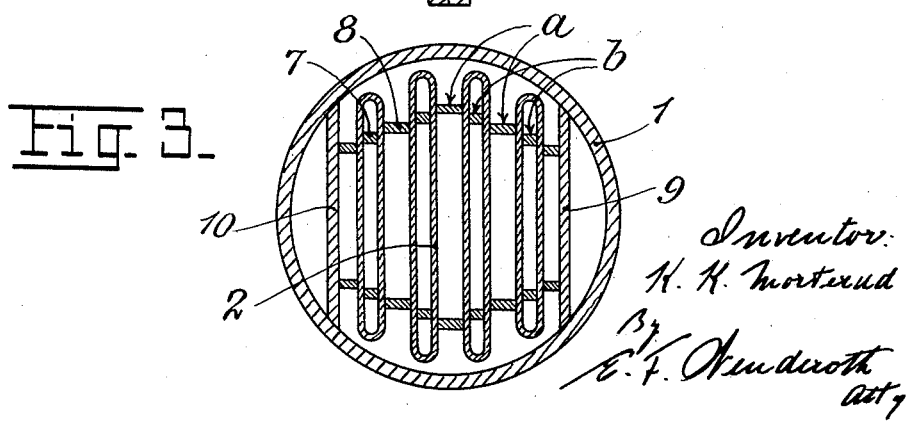

Patented Sept. 12, 1933

1,926,494

UNITED STATES PATENT OFFICE 1,926,494

HEATING DEVICE

Knut Kristoffer Morterud, Oslo, Norway

Application May 11, 1933. Serial No. 670,608

5 Claims. (Cl. 257—224)

The present invention relates to a heating device for the transmission of heat to liquids passing along the exterior surface of pressure steam tubes, and more particularly the invention relates to heating devices of the kind specified in which the pressure steam heating tubes have an elongated cross section with substantially flat parallel side surfaces.

In accordance with the invention a number of these pressure steam heating tubes are placed with their substantially flat side surfaces parallel to and a short distance from each other, the set of tubes being enclosed in a pressure resisting chamber or casing, through which the liquid to be heated passes.

Further, in accordance with the invention the said pressure steam heating tubes are provided between their flat parallel side surfaces with interior longitudinal ribs extending between the said surfaces, other longitudinal ribs being placed between the opposed exterior side surfaces of adjacent heating tubes and between the flat side surfaces of the outer tubes and the interior wall of the pressure resisting casing enclosing the same, said ribs serving to reinforce the flat tube walls against exterior and interior pressure.

The pressure resisting casing may have a square or rectangular cross section, but in accordance with one preferred embodiment of the invention the pressure resisting casing has a circular cross section, and in that case in accordance with the present invention the pressure resisting casing is provided with two substantially flat interior surfaces parallel to and adjacent the exterior surfaces of the two outer pressure steam heating tubes.

On the drawing:

Figure 1 is a longitudinal section of a heating device in accordance with an embodiment of the invention, Figure 2 is a cross section of the heating device illustrated on Figure 1, and Figure 3 is a cross section of a modified form of heating device.

The heating device as illustrated comprises a pressure resisting chamber 1 enclosing a number of parallel steam heating tubes 2 having an elongated cross section with substantially flat side surfaces. The steam heating tubes 2 are interconnected at the top and at the bottom in a manner well known per se by means of short tubes 3, 4, forming connecting channels for the intake and outlet of pressure steam. The connection between the steam heating tubes 2 through the tubular members 3, 4 may take place in any suitable manner, such as by welding, screwthreaded bolts or the like, not illustrated on the drawing. Also the connection of the set of pressure steam tubes with the steam inlet opening 5 and outlet opening 6 may take place in any conventional manner, suitable packings being provided for preventing leakage of pressure steam.

As indicated on Figure 2 the pressure resisting casing 1 may be made in two halves, which can be easily separated in order to obtain access to the heating tubes.

Each heating tube is provided with interior longitudinal ribs 7 extending between the parallel side surfaces and serving to reinforce the same against exterior pressure. One, two or more such ribs may be provided for each pressure tube, although under ordinary circumstances it is preferred to have two ribs inside each pressure tube and in the spaces between the pressure tubes as well as between the outer pressure tubes and the interior side walls of the pressure resisting casing.

In accordance with the embodiment of the invention illustrated by the cross sectional view of Figure 3 the pressure resisting casing 1 has a cylindrical shape and is provided in its interior with two flat surfaces, 9, 10 parallel to and adjacent the exterior surfaces of the outer steam pressure tubes.

The ribs 7, 8 on the embodiment illustrated on Figure 3 are located in staggered relation to each other, although the lines of contact between the ribs engaging the inside and outside of one flat side wall should not be too far apart, as each rib should be adapted to transmit pressure exerted by another rib engaging the opposite side of the same surface.

I claim:

1. A heating device for the transmission of heat to liquids passing along the exterior surface of pressure steam tubes comprising a number of pressure steam tubes with substantially flat parallel side surfaces located adjacent to each other, a pressure resisting casing enclosing said tubes, longitudinal ribs extending between said parallel side surfaces inside said tubes and longitudinal ribs extending between opposed surfaces on adjacent tubes as well as between the two outer tubes and the interior wall of the pressure resisting casing.

2. A heating device for the transmission of heat to liquids passing along the exterior surface of pressure steam tubes comprising a number of pressure steam tubes with substantially flat parallel side surfaces located adjacent each other, a pressure resisting casing enclosing said tubes, longitudinal ribs extending between said parallel side surfaces inside said tubes and being secured by welding to one of said surfaces and longitudinal ribs extending between opposed surfaces on adjacent tubes as well as between the two outer tubes and the interior wall of the pressure resisting casing.

3. A heating device for the transmission of heat to liquids passing along the exterior surface of pressure steam tubes comprising a number of pressure steam tubes with substantially flat parallel side surfaces located adjacent each other, a pressure resisting casing having a circular cross section enclosing said tubes, longitudinal ribs extending between said parallel side surfaces inside said tubes and longitudinal ribs extending between opposed surfaces on adjacent tubes as well as between the two outer tubes and the interior wall of the pressure resisting casing.

4. A heating device for the transmission of heat to liquids passing along the exterior surface of pressure steam tubes comprising a number of pressure steam tubes with substantially flat parallel side surfaces located adjacent each other, a pressure resisting casing having a circular cross section enclosing said tubes, longitudinal ribs extending between said parallel side surfaces inside said tubes and longitudinal ribs extending between opposed surfaces on adjacent tubes as well as between the two outer tubes and the interior wall of the pressure resisting casing, said longitudinal ribs being located in staggered relation to each other.

5. A heating device for the transmission of heat to liquids passing along the exterior surface of pressure steam tubes comprising a number of pressure steam tubes with substantially flat parallel side surfaces located adjacent each other, a pressure resisting casing having a circular cross section enclosing said tubes, longitudinal ribs extending between said parallel side surfaces inside said tubes and longitudinal ribs extending between opposed surfaces on adjacent tubes as well as between the two outer tubes and the interior wall of the pressure resisting casing, said pressure resisting casing having substantially flat interior surfaces parallel with and adjacent the two outer tubes.

KNUT KRISTOFFER MORTERUD.